United States Patent
Zheng

(10) Patent No.: US 11,490,245 B2
(45) Date of Patent: Nov. 1, 2022

(54) CONTROLLING SOFTWARE OVER-THE-AIR (OTA) UPDATES BASED ON SIM ELIGIBILITY

(71) Applicant: T-Mobile USA, Inc., Bellevue, WA (US)

(72) Inventor: Pei Zheng, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 13 days.

(21) Appl. No.: 17/141,041

(22) Filed: Jan. 4, 2021

(65) Prior Publication Data

US 2022/0217526 A1 Jul. 7, 2022

(51) Int. Cl.
*H04W 8/18* (2009.01)
*H04W 12/72* (2021.01)
*H04W 8/20* (2009.01)
*H04W 12/06* (2021.01)
*H04W 12/30* (2021.01)

(52) U.S. Cl.
CPC ........... *H04W 8/183* (2013.01); *H04W 8/205* (2013.01); *H04W 12/06* (2013.01); *H04W 12/35* (2021.01); *H04W 12/72* (2021.01)

(58) Field of Classification Search
CPC ..... H04W 8/183; H04W 8/205; H04W 12/06; H04W 12/35; H04W 12/72; G06F 8/65; G06F 8/71; G06F 8/61; G06F 8/60; H04M 1/72406
See application file for complete search history.

(56) References Cited

U.S. PATENT DOCUMENTS

2017/0195459 A1* 7/2017 e Costa ................ H04L 67/327
2020/0249938 A1* 8/2020 Shin ......................... G06F 8/71

* cited by examiner

*Primary Examiner* — Philip Sobutka
(74) *Attorney, Agent, or Firm* — Lee & Hayes, P.C.

(57) ABSTRACT

Techniques for controlling software over-the-air (OTA) updates based on SIM eligibility for a device are discussed herein. The device may include a 5G SA capable device with 5G features that may not be enabled yet. To enable support for a new 5G feature, the system may update the SIM profile on the SIM card to indicate infrastructure support and the firmware to enable function calls for the new 5G feature. However, the SIM profile has to include infrastructure support before enabling function calls for the new 5G feature; otherwise, an incorrect firmware update may cause the device to cease functioning. The present system may include OTA components on a device server to connect with a network API on the carrier server and perform SIM profile checks before transmitting firmware updates to an OTA agent on the device.

20 Claims, 7 Drawing Sheets

CONTROLLING SOFTWARE OVER-THE-AIR (OTA) UPDATES BASED ON SIM ELIGIBILITY

BACKGROUND

Modern telecommunication systems include heterogeneous mixtures of second, third, fourth, and fifth generation (2G, 3G, 4G, 5G) cellular wireless access technologies, which may be cross-compatible and may operate collectively to provide communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies.

To take advantage of the multigenerational mix of wireless communication technologies, interworking devices may be configured with capabilities communicate not only via various types of communication applications but also via various types of networks. These interworking devices enable connectivity between old and new network elements to support the legacy infrastructure and systems while building out the next-generation networks.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
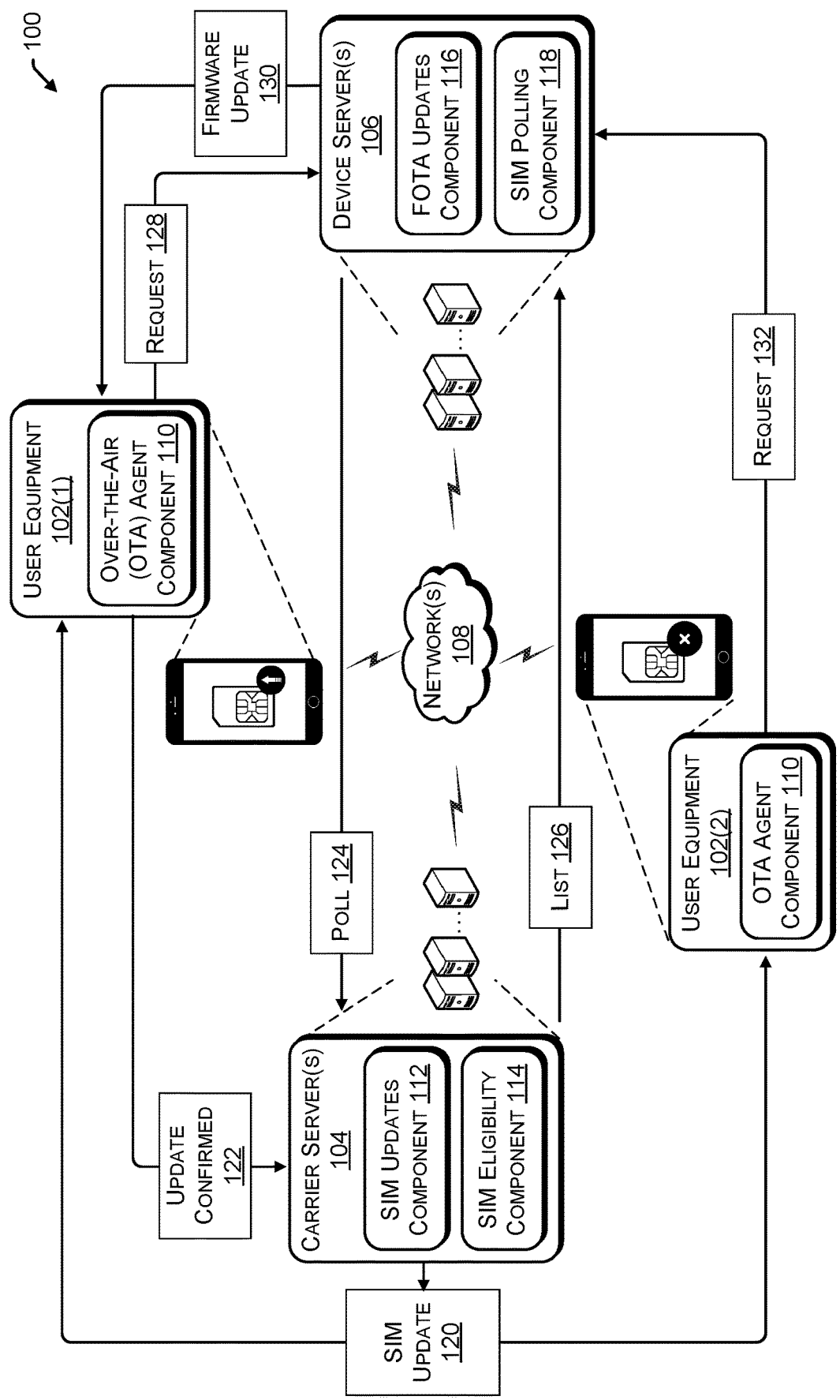
FIG. 1 illustrates an example system including a carrier server and a device server configured to control software over-the-air (OTA) updates based on a subscriber identity module (SIM) eligibility.

Techniques for controlling software over-the-air (OTA) updates based on SIM eligibility for a device are discussed herein. In some examples, the device may include a 5G Standalone (SA) capable device and the OTA updates may be associated with 5G SA updates. The 5G SA capable device may include a device with 5G capabilities, but the 5G features are not be enabled yet. To configure the 5G capable but-not-yet-enabled device to support a new 5G feature (e.g., SA mode), the system needs to update at least: (1) the SIM profile on the SIM card to indicate infrastructure support for the new 5G feature; and (2) the firmware on the device to enable function calls for the new 5G feature. However, because a cellular carrier generally provides the SIM updates while a device manufacturer generally provides the firmware update, the firmware may be pushed out by the device manufacturer before the device has the proper SIM profile, which could cause the device to cease functioning properly. The present system provides a solution for a device server associated with the device manufacturer to connect with a network node (referred herein as "carrier server") associated with the cellular carrier and perform SIM profile checks before transmitting any firmware updates.

In various examples, the system may include OTA update components that operate from a device server, a device (referred herein as "user equipment (UE)"), and the carrier server to facilitate communication between the servers and devices. For example, the system may include a firmware over-the-air (FOTA) update component on the device server, a FOTA agent on the UE, and a SIM eligibility component on the carrier server.

In some examples, the system may include a device server (referred herein as "FOTA server") associated with the device manufacturer to control FOTA updates. The FOTA updates may enable and/or upgrade one or more 5G device features. The FOTA server may include a FOTA update component to receive firmware updates from the device development team and send notifications of available updates to the FOTA agent on corresponding devices (e.g., UE). The FOTA server may receive requests for firmware updates from a FOTA agent. Before sending out the FOTA update, the FOTA server may connect with the cellular carrier to determine whether the UE is associated with a subscription that provides the infrastructure support.

In various examples, the system may include a FOTA agent for the UE to control FOTA updates on the UE. The UE may include a SIM card with a SIM profile that indicates the UE is associated with a 5G SA subscription for a cellular carrier. Additionally, the SIM profile may indicate any 5G features and/or services that are supported by the carrier network and by the UE based on the subscription. The FOTA agent may receive notifications of available firmware updates from the FOTA server. The FOTA agent may send firmware checks to the FOTA server. The firmware checks may be triggered by different conditions, including notifications of available firmware updates, periodic update checks, new SIM card detections, user input to perform checks, and the like.

In some examples, the system may include a carrier server for the service provider (e.g., "cellular carrier") associated with the UE to provide SIM eligibility information. In various examples, the carrier server may include a SIM eligibility component to receive eligible SIM checks from the FOTA server. The carrier server may maintain a subscriber database for subscription-related information to support SIM eligibility checks. In response to the eligible SIM checks, the carrier server may return a list of eligible SIMS or a confirmation for an individual SIM. The SIM eligibility component may include a web service to provide an API (Application Programming Interface) that the FOTA server can call to perform the SIM profile checks. The system may include different operating modes that trigger the SIM profile checks. The different operating modes may be triggered based on batch polling, instance polling, and SIM card change.

In some examples, the system may perform SIM profile checks based on batch polling. In batch polling mode, the FOTA server may poll the carrier server to request an updated eligible list of SIMS ("allowed-list"), and the poll may be repeated on a predetermined polling cycle (e.g., every 12 hours, daily, weekly, etc.). The batch polling request may be transmitted with query data indicating features to verify support for before updating the firmware. In various examples, the query data may include prerequisite SIM data. In additional and/or alternative examples, the query data may include one or more of: the device type, the technology identifier, the timestamp, and the like. In response to the batch polling request, the carrier server may return the allowed-list, with a list of eligible SIMS, to the FOTA server. When the FOTA agent installed on the UE requests a firmware update check from the FOTA server, the FOTA server will check if the SIM identifier is on the allowed-list before transmitting any firmware updates.

In various examples, the system may perform SIM profile checks based on instance polling. In instance polling mode, the FOTA server may poll the carrier server to request a particular SIM profile check in response to a request from a particular UE. Like batch polling, the instance polling request may be transmitted with query data. The query data may further include the particular SIM identifier (e.g., International Mobile Subscriber Identity (IMSI)) to check. In response to the instance polling request, the carrier server may return a device eligibility status (e.g., TRUE or FALSE) indicating whether the particular SIM identifier is eligible for the firmware update to the FOTA server. The FOTA server may transmit the firmware update based on the device eligibility status. For instance, a FOTA agent on a UE sends an update request with a SIM IMSI, and the FOTA server calls an API on the carrier server with the SIM IMSI to check eligibility. If the carrier server returns a confirmation, then the FOTA server may transmit the update to the UE.

In various examples, the system may perform SIM profile checks based on a SIM card change. In SIM card change mode, a particular UE installs a firmware update after a proper SIM check, but a user installs a new SIM card with a different SIM profile that may or may not be supported. In some examples, the new SIM card is associated with a new carrier, and the FOTA server may verify infrastructure support with the new carrier before the device executes the currently installed firmware, which could lock the device. In response to a new SIM card detection, the FOTA agent may send a request to check firmware to the FOTA server. The FOTA server may send an instance polling request to the appropriate carrier server. If the carrier server returns an indication that the SIM identifier is ineligible for the features enabled by the firmware, the FOTA server may return a message to the FOTA agent to notify the user of the incompatibility and request a SIM update. In some examples, the FOTA agent may trigger a reinstall of an older version of the firmware.

As described herein, to take advantage of the 5G SA wireless communication technologies, a UE configured for the 5G core network must include infrastructure support for the 5G features as indicated by the SIM profile and function support for the 5G features as enabled by the firmware. For instance, if a device manufacturer wants to push new firmware to enable a 5G feature, the device manufacturer has to check if the carrier for the device has the infrastructure to support the 5G feature. Otherwise, the UE may crash when attempting to call an unsupported feature. Additionally, a UE may have the correct SIM profile and firmware updates but then switch to a different carrier with a new SIM card that has yet to be verified as compatible, which may also cause the UE to crash. Accordingly, determining the SIM eligibility of a UE before updating the firmware or executing the updated firmware with new a SIM card may reduce the chances of causing the UE to be inoperable.

The systems and methods described herein can be used to control, at a FOTA server, firmware updates for a UE based on the SIM eligibility. As noted above, if the UE is not associated with a 5G SA subscription or does not have the correct SIM profile installed, the operations can refrain from downloading any firmware updates and/or executing unsupported firmware which may cause operation error. This optimizes data transfer and improves software update logic because updates can be avoided or prevented from running without waiting for device operation error; thus, data usage and customer experience are improved. Moreover, by allowing the FOTA server to determine the SIM eligibility of the UE before sending updates, the system may refrain from performing unnecessary update transmission, which reduces network bandwidth usage. These and other improvements to the functioning of a computer and network are discussed herein.

In some examples, the techniques discussed herein can be implemented in the context of protocols associated with one or more of 3G, 4G, 4G LTE, 5G protocols. In some examples, the network implementations can support stand-alone architectures, non-standalone architectures, dual connectivity, carrier aggregation, etc. Example implementations are provided below with reference to the following figures.

FIG. 1 illustrates an example system 100 including a carrier server and a device server configured to control software over-the-air (OTA) updates based on subscriber identity module (SIM) eligibility.

The user equipment 102(1) and user equipment 102(2) (collectively referred to as UE 102) can communicatively connect with other devices, including network node(s) (e.g., carrier server(s) 104) associated with a cellular carrier and FOTA server(s) (e.g., device server(s) 106) associated with a device manufacturer, via one or more network(s) 108. In an example, the example system 100 shows UE 102(1) and UE 102(2) can connect to the one or more network(s) 108 to engage in update checks, SIM updates, firmware updates, data transfers, and/or any other type of communication. The UE 102 can be any user device that can connect and communicate between the next-generation network (e.g., 5G SA) and the legacy network (e.g., 4G LTE). In some examples, the UE 102 can be a mobile phone, such as a smartphone or other cellular phone. In other examples, the UE 102 can be a personal digital assistant (PDA), a media player, a tablet computer, a gaming device, a smartwatch, a hotspot, a personal computer (PC) such as a laptop, desktop, or workstation, or any other type of computing or communication device. The UE 102 may include a SIM card and an over-the-air (OTA) agent component 110. In some examples, the UE 102 may use data from the SIM card and the OTA agent component 110 to establish connections with corresponding OTA servers to transmit update data, including information to identify the device and/or software version.

The UE 102 may include a SIM card from a cellular carrier. The SIM card may store data ("SIM data" or "SIM profile") associated with the UE 102, the carrier, and/or subscription information. In some examples, the SIM profile may indicate the UE 102 is associated with a 5G SA subscription for a cellular carrier and may further indicate any 5G features and/or services that are supported based on the subscription. The SIM data may include the carrier and/or network information used to authenticate and identify subscribers on the network, the information including, but not limited to, an international mobile subscriber identity (IMSI), authentication key, an Integrated Circuit Card Identification Number (ICCID), Local Area Identity (LAI), Service Provider Name (SPN), Service Dialing Numbers (SDN), a Subscription Concealed Identifier (SUCI), a Subscription Permanent Identifier (SUPI), and the like.

The OTA agent component 110 may include one or more OTA agents to support software updates and/or related data transmission. An OTA agent may connect to a particular OTA server to update a particular software. For instance, a SIM OTA agent may connect to a carrier server to update the SIM profile, and a FOTA agent may connect to a FOTA server to update the firmware. In some examples, the OTA agent component 110 may receive notifications on available updates, transmit requests to download updates, and install updates. The OTA agent component 110 may determine to wait to update the download based on a predetermined download time (e.g., at 2 am), based on the network type the UE 102 is connected to (e.g., Wi-Fi), based on user input to wait, and the like.

The OTA agent component 110 may include a SIM OTA agent to control SIM OTA updates. The SIM OTA agent may connect to the carrier server(s) 104 to update the SIM profile. In some examples, the carrier server(s) 104 may push a SIM update to the OTA agent component 110 associated with a subscription with a particular device type. The OTA agent component 110 may receive and install the update. In response to a successful update install, the OTA agent component 110 may send an update confirmation to the carrier server(s) 104.

The OTA agent component 110 may include a FOTA agent to control firmware OTA updates. In some examples, the FOTA agent may receive a firmware update notification from the device server(s) 106. The FOTA agent may send an update request to the device server(s) 106. The update request may be based on trigger conditions including, but not limited to, the update notification, a periodic check time (e.g., every night, once a week, etc.), a user input to check for updates, a new SIM card detected, and the like. The FOTA agent may receive and install the firmware update after the device server(s) 106 confirms the SIM eligibility. In some instances, the FOTA agent may detect a new SIM card for switching to a new carrier. If the new SIM card is detected after a firmware update was successfully installed, the FOTA agent may send a firmware check to the device server(s) 106. If the FOTA agent receives a failed SIM eligibility check, the FOTA agent may display a notification to request a SIM profile update from the associated carrier. In additional and/or alternative examples, if a new SIM card is detected and the device server(s) 106 denies SIM eligibility, the FOTA agent may determine to roll back to a previous firmware version.

In some examples, the UE 102 can wirelessly connect to the carrier server(s) 104, the device server(s) 106, one or more network nodes, or network servers, via the network(s) 108 or other access points. In some examples, the network(s) 108 can be a packet core network of an LTE network, which may be referred to as an Evolved Packet Core (EPC). In other examples, the network(s) 108 can be a 5G core network.

The carrier server(s) 104 can include a SIM updates component 112 and a SIM eligibility component 114. In some instances, the carrier server(s) 104 and the device server(s) 106 can include implementing one or more communication servers to facilitate communications by and between the various devices in the system 100. That is, the carrier server(s) 104 can represent any computing devices implementing various aspects of one or more of second, third, fourth, and fifth generation (2G, 3G, 4G, and 5G) cellular wireless access technologies, which may be cross-compatible and may operate collectively to provide data communication services.

Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies. Thus, the carrier server(s) 104 may implement GSM, UMTS, LTE/LTE Advanced, and/or NR telecommunications technologies.

In some instances, telecommunication technologies can be referred to generally as radio access technology. Thus, a 5G network can represent 5G radio access technology. The carrier server(s) 104 may include, but is not limited to, a combination of: base transceiver stations (BTSs) (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user equipment 102, the carrier server(s) 104, the device server(s) 106, and/or the network(s) 108. In some embodiments, the carrier server(s) 104 may be operated by one or more service providers. A service provider may include a wireless service provider, telecommunications service provider, cellular carrier, network operator, mobile operator, and the like. The carrier server(s) 104 and associated components, including the SIM updates component 112 and the SIM eligibility component 114, may configure a database to maintain subscriber information with associated SIM card information to support the OTA updates.

The SIM updates component 112 may include functions to provide SIM OTA updates. In various examples, the SIM updates component 112 may receive a SIM update and determine a list of eligible devices from the database based in part on the device type and/or subscription information. The SIM updates component 112 may push the SIM update to the list of eligible devices. In some examples, the SIM updates component 112 may receive update confirmations from the devices and store the associated SIM identifiers for the SIM eligibility component 114.

The SIM eligibility component 114 may maintain a subscriber database with associated SIM data to support OTA updates. The SIM eligibility component 114 can collect data associated with subscribers, subscriber sessions, and/or registrations in the subscriber database. In various examples, the SIM eligibility component 114 may utilize a common data repository, a shared database providing support for 2G/3G/4G/5G core, to store subscriber related data, including subscriber information. The SIM eligibility component 114 may collect and store information specific to the subscriber accounts and subscription, including one or more of: authorized user(s), username(s), account identifier, subscription, services, and the like. The SIM eligibility component 114 can also collect information specific to one or more UEs associated with a subscriber account, including a device type, a device identifier, communications capabilities, and the like. The SIM eligibility component 114 may receive information from the UE including one or more of: Subscriber Identity Module (SIM), SIM profile, Mobile Station International Subscriber Directory Number (MSISDN), an International Mobile Subscriber Identity (IMSI), International Mobile Equipment Identity (IMEI), and the like.

The SIM eligibility component 114 may receive an eligible SIM poll from a FOTA server (e.g., the device server(s) 106). In some examples, the SIM eligibility component 114 may configure a web service to expose a network API for the FOTA server to access. The FOTA server for a device manufacturer can call the network API and provide polling input to receive the eligible SIM output from the SIM eligibility component 114. In various examples, the polling input may indicate the polling mode and query data. The query data may include one or more of: a device type, a feature identifier, a SIM identifier, a timestamp, an authentication key, and the like. The SIM eligibility component 114 may access and query the subscriber database for SIM profiles that indicates support for the device type and the feature identifier. In response to the eligible SIM poll, the SIM eligibility component 114 may generate an eligible SIM output. If the poll is in batch polling mode, the SIM eligibility component 114 may generate a list of eligible SIMS. If the poll is in instance polling mode and/or SIM card change mode, the SIM eligibility component 114 may generate a device eligibility status (e.g., TRUE or FALSE) for the SIM profile associated with the SIM identifier. The SIM eligibility component 114 may return the eligible SIM output to the device server(s) 106.

The device server(s) 106 can include a FOTA updates component 116 and a SIM polling component 118. The device server(s) 106 may include any combination of network nodes, servers, computers, and/or any other type of computing or communication devices. The device server(s) 106 may be operated by one or more device manufacturers to provide associated device information and/or software, including firmware updates. The device server(s) 106 and associated components, including the FOTA updates component 116 and the SIM polling component 118, may control FOTA updates based on SIM eligibility.

The FOTA updates component 116 may receive and distribute firmware updates to eligible devices. In some examples, the FOTA updates component 116 may receive a firmware update for a device group from the device development team. The device group may include one or more devices grouped by one or more grouping scheme, including device type, device model, device family, region, carrier, and the like. The firmware update may enable and/or upgrade one or more device features (e.g., enable 5G SA mode). In various examples, the FOTA updates component 116 may send notifications of available updates to the FOTA agent on devices (e.g., UE 102) from the device group.

The FOTA updates component 116 may receive requests for firmware updates from the FOTA agent. Before sending out the firmware, the FOTA updates component 116 may call the SIM polling component 118 to connect with the carrier server(s) 104 to determine whether a device is associated with a subscription that indicates support for the one or more device features.

The SIM polling component 118 may include functions to connect with the carrier server(s) 104 and perform SIM profile checks. As described herein, the carrier server(s) 104 may provide a network API that the SIM polling component 118 can call to perform the SIM profile checks. The SIM polling component 118 may include different operating modes that trigger the SIM profile checks. The different operating modes may be triggered based on batch polling, instance polling, and SIM card change.

In some examples, the SIM polling component 118 may perform the SIM profile checks based on batch polling. In batch polling mode, the SIM polling component 118 may transmit a batch polling request to the carrier server(s) 104 to request an updated eligible list of SIMS ("allowed-list"), and the polling may be repeated on a predetermined polling cycle (e.g., every 12 hours, daily, weekly, etc.). The batch polling request may be transmitted with query data indicating the one or more device features to verify support for. In various examples, the query data may include prerequisite SIM data. In additional and/or alternative examples, the query data may include one or more of: the device type, the feature identifier, the timestamp, and the like. In response to the batch polling request, the SIM polling component 118 may receive, from the carrier server(s) 104, the "allowed-list," including the list of eligible SIMS. When the FOTA agent, on a device, sends a firmware update check with an associated SIM identifier, the SIM polling component 118 may check if the SIM identifier is on the allowed-list and, if the check is affirmative, the FOTA updates component 116 may transmit the update.

In various examples, the SIM polling component 118 may perform the SIM profile checks based on instance polling. In instance polling mode, the SIM polling component 118 may poll the carrier server(s) 104 to request a particular SIM profile check in response to a request from a particular device. Like batch polling, the instance polling request may be transmitted with query data. The query data may further include the particular SIM identifier (e.g., International Mobile Subscriber Identity (IMSI)) to check. In response to the instance polling request, the SIM polling component 118 may receive, from the carrier server(s) 104, a device eligibility status (e.g., TRUE or FALSE) indicating whether the particular SIM identifier is eligible for the firmware update. If the device eligibility status is affirmative, the FOTA updates component 116 may transmit the firmware update to a FOTA agent on the particular device.

In various examples, the SIM polling component 118 may perform the SIM profile check based on a SIM card change. In SIM card change mode, the particular device has the latest firmware installed after an eligible SIM check, but a user of the device installs a new SIM card associated with a new carrier. The new SIM card includes a different SIM profile that may or may not indicate support for the device features enabled by the latest firmware. In some examples, the SIM polling component 118 may verify infrastructure support with the new carrier before the device executes the currently installed firmware to avoid locking the device and/or otherwise causing the device to malfunction. In response to the new SIM card detection, the FOTA agent on the device may send a firmware check request to the FOTA updates component 116. The SIM polling component 118 may send an instance polling request to a new carrier server(s) 104 associated with the new carrier. In some examples, if the new carrier server(s) 104 returns an indication that the SIM identifier is not eligible for the currently installed firmware, the FOTA updates component 116 may return a message to the FOTA agent to notify the user of firmware incompatibility and request a SIM update.

While FIG. 1 illustrates the network(s) 108, it is understood in the context of this document that the techniques discussed herein may also be implemented in other networking technologies, such as nodes that are part of a wide area network (WAN), metropolitan area network (MAN), local area network (LAN), neighborhood area network (NAN), personal area network (PAN), or the like. Examples of the network(s) 108 can include but are not limited to networks including second-generation (2G), third-generation (3G), fourth-generation (4G) cellular networks, such as LTE (Long Term Evolution), fifth-generation (5G) networks, and data networks, such as Wi-Fi networks.

In some instances, the UE 102 can communicate with any number of user equipment, user devices, servers, network devices, computing devices, and the like.

As a non-limiting example, the example system 100 can illustrate an example process to control a 5G device software OTA update based on SIM eligibility. The example system 100 includes a device server 106 controlling software OTA updates for UE 102(1) and UE 102(2) by calling a SIM eligibility network API on a carrier server 104. In the present example, the UE 102 may include the OTA agent component 110, the carrier server 104 may include the SIM updates component 112 and SIM eligibility component 114, and the device server 106 may include the FOTA updates component 116 and the SIM polling component 118.

Initially, to provide infrastructure support for 5G features, the SIM updates component 112 may push an example SIM update 120 to active subscribers associated with an example device group. The example device group may include subscribers with 5G SA capable devices with 5G features that are not yet enabled and may include the UE 102(1) and the UE 102(2).

The UE 102(1), via the OTA agent component 110, may receive the example SIM update 120, install the example SIM update 120, and transmit an example update confirmation 122 with an example SIM identifier to the carrier server 104 after a successful update. The SIM updates component 112 and/or the SIM updates component 112 may receive the example update confirmation 122 and log the confirmation with the example SIM identifier to a subscriber database. The UE 102(2), via the OTA agent component 110, may have received the example SIM update 120, but transmission or installation was stopped by the network or user input, or the UE 102(2) failed to receive the example SIM update 120. Accordingly, the carrier server(s) 104 did not receive any confirmation from the UE 102(2), and there is no logged confirmation for the UE 102(2).

To enable function calls for 5G features, the FOTA updates component 116 may receive an example firmware update to enable a new feature for the example device group. Based on the new feature, the SIM polling component 118 may perform an example batch poll 124 with a feature identifier for the new feature by calling the API configured by the SIM eligibility component 114. The SIM eligibility component 114 may return an example list of eligible SIMS 126 that includes the example SIM identifier for UE 102(1) but not UE 102(2).

In response to an example notification from the FOTA updates component 116 and/or to an example weekly check, the OTA agent component 110 on the UE 102(1) may send, to the device server 106, an example update request 128 with the example SIM identifier for UE 102(1) to check for any available firmware updates. The FOTA updates component 116 may call the SIM polling component 118 to determine that the example SIM identifier is included in the example list of eligible SIMS 126. Based on determining the example SIM identifier is included, the FOTA updates component 116 transmits the example firmware update 130 to the UE 102(1).

Also, in response to an example notification from the FOTA updates component 116 and/or to an example weekly check, the OTA agent component 110 on the UE 102(2) may send, to the device server 106, an example update request 132 with a second example SIM identifier for UE 102(2) to check for any available firmware updates. The FOTA updates component 116 may call the SIM polling component 118 to determine that the second example SIM identifier is not included in the example list of eligible SIMS 126. Based on determining the second example SIM identifier not is included, the FOTA updates component 116 may ignore the example update request 132 and wait for the next weekly check, or the FOTA updates component 116 may send a notification to the UE 102(2) to request a SIM profile update from the carrier.

Figure 2:
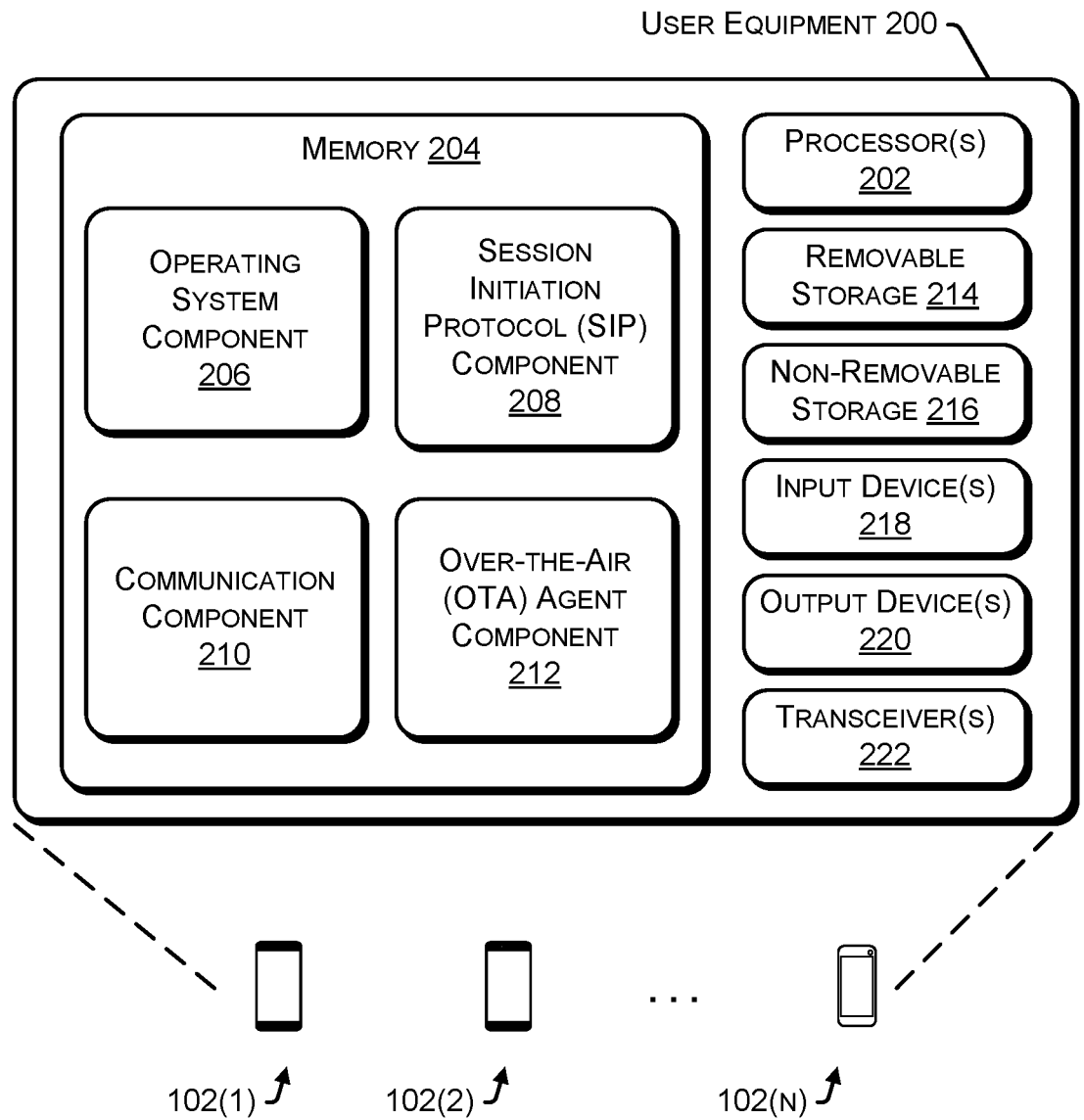
FIG. 2 is a block diagram of user equipment (UE) configured to receive software OTA updates based on SIM eligibility.

FIG. 2 is a block diagram of user equipment 200 configured to receive software OTA updates based on SIM eligibility. In some embodiments, the UE 200 can correspond to the user equipment 102(1) and the user equipment 102(2) of FIG. 1. It is to be understood in the context of this disclosure that the UE 200 can be implemented as a single device or as a plurality of devices with components and data distributed among them. By way of example, and without limitation, the UE 200 can be implemented as various user equipment 200(1), 200(2), . . . , 200(N).

As illustrated, the UE 200 comprises a memory 204 storing an operating system component 206, a Session Initiation Protocol (SIP) component 208, a communication component 210, and an over-the-air (OTA) agent component 212. Also, the UE 200 includes processor(s) 202, a removable storage 214 and non-removable storage 216, input device(s) 218, output device(s) 220, and transceiver(s) 222.

In various embodiments, the memory 204 is volatile (such as RAM), non-volatile (such as ROM, flash memory, etc.) or some combination of the two. The operating system component 206, the SIP component 208, the communication component 210, and the OTA agent component 212 stored in the memory 204 can comprise methods, threads, processes, applications, or any other sort of executable instructions. The operating system component 206, the SIP component 208, the communication component 210, and the OTA agent component 212 can also include files and databases.

The operating system component 206 can include functionality to identify and track the different applications installed on the UE 200. The operating system component 206 can include functionality to query a chipset of the UE 200, and/or query the transceiver(s) 222, to instruct the transceiver(s) 222 and/or any software or hardware to scan one or more channels or frequency resources to determine metrics associated with the channel or frequency resources, for example. In some instances, the operating system component 206 can include an API to receive instructions from one or more of the SIP component 208, the communication component 210, and the OTA agent component 212 and to provide data to the corresponding components, including identifying the communication clients and/or communication capabilities of the UE 200 and/or a serving network, and notifying the components of clients and/or capabilities. The serving network may include one or more network(s) that the UE 200 is currently communicatively connected to. For instance, user equipment 200 may be connected to a 5G cellular network and/or connected to a home Wi-Fi network.

The SIP component 208 may enable communications to be served using SIP instances and/or SIP messages. The SIP component 208 may transmit SIP messages containing information for identifying the user account, user equipment, and/or the communication client to serve a communication session including but not limited to: SIP instance information, access network information, Mobile Station International Subscriber Directory Number (MSISDN), International Mobile Subscriber Identity (IMSI), International Mobile Equipment Identity (IMEI) of the device, Universally Unique Identifier (UUID), called-party-address as Circuit-Switched Routing Number (CSRN), and session description protocol (SDP). The SIP component 208 may use SIP signaling and determine the current location of the UE 200 using a Global Positioning System (GPS).

In some examples, a phone mode may be determined based at least in part on a location (e.g., the current location) associated with the UE. For example, if the current location of the UE 200 is within a geographic area in which a service provider, associated with an identifier of the UE 200, provides coverage, then the phone mode may be set to carrier mode. If the current location of the UE 200 is in a geographic area in which the service provider does not provide coverage, then the phone mode may be set to Over-The-Top (OTT) mode. In some examples, the SIP component 208 may determine, based on the phone mode not set to carrier mode, that certain carrier-specific functions may be unavailable, including, but not limited to, selecting certain types of communications or client designations. For instance, the SIP component 208 may determine the UE 200 is currently not in carrier mode and may not be able to use certain features of the 5G SA network.

In various examples, the SIP component 208 may transmit SIP messages with headers and/or strings to trigger specific functions and/or commands. As described herein, the SIP information may include information identifying an originating party and a terminating party. Additionally, the SIP information may include one or more commands: PUBLISH, SUBSCRIBE, NOTIFY, and the like.

The communication component 210 may configure a communication client for send and receive communication data. The communication component 210 may determine the capability of the UE 200 and the serving network to determine the enabled feature information for a communication client. As described herein, the serving network may include one or more network(s) that the UE 200 is currently registered to. In response to registering to a network, communication component 210 may send, to the network, a publish request to set the enabled feature information of the communication client. While the communication component 210 may send the enabled feature information to the network, it is understood in the context of this document that the UE 200 may send and/or receive the enabled feature information via the SIP component 208, the communication component 210, the OTA agent component 212, and/or another component. Additionally, and/or alternatively, the UE 200 may send the enabled feature information to the network in response to an interrogation poll rather than as a publish request.

The communication component 210 may include functionality to send and receive communications (e.g., voice calls, texts, instant messages, etc.) and/or determine when to transition an existing communication from one access network to another. In some examples, the communication component 210 may perform a number of functions, such as interfacing with the transceiver(s) 222, preparing the UE 200 to receive communications, tuning the transceiver(s) 222, receiving and processing an invitation message such as a SIP instance received via the transceiver(s) 222, and the like. In various examples, the communication component 210 may establish a communication session and/or network connection for the OTA agent component 212 to communicate with an OTA server.

The OTA agent component 212 may include functions to perform software update processes. In some instances, the OTA agent component 212 can correspond to the OTA agent component 110 of FIG. 1. As described herein with respect to the OTA agent component 110, the OTA agent component 212 may include one or more OTA agents to support software updates and/or related data transmission. An OTA agent may connect to a particular OTA server to update a particular software. For instance, a SIM OTA agent may connect to a carrier server to update the SIM profile, and a FOTA agent may connect to a FOTA server to update the firmware. In some examples, the OTA agent component 212 may perform one or more of the update processes, including receive notifications for available updates, schedule update time, transmit requests to download updates, install updates, and/or send installation confirmations. The OTA agent component 212 may pause and/or resume an update process based on one or more factors, including, but not limited to, the current time is outside of a predetermined download window (e.g., wait until 2 AM-6 AM), the connected network type (e.g., not Wi-Fi), received user input to wait, and the like.

The OTA agent component 212 may include a SIM OTA agent to control SIM OTA updates. The SIM OTA agent may connect to a carrier server to update the SIM profile. In some examples, the carrier server may push a SIM update to the OTA agent component 212 associated with a subscription with a particular device type. The OTA agent component 212 may receive and install the update. In response to a successful update install, the OTA agent component 212 may send an update confirmation to the carrier server.

The OTA agent component 212 may include a FOTA agent to control firmware OTA updates. In some examples, the FOTA agent may receive a firmware update notification from a FOTA server. The FOTA agent may send an update request to the FOTA server. The update request may be based on trigger conditions including, but not limited to, the update notification, a periodic check time (e.g., every night, once a week, etc.), a user input to check for updates, a new SIM card detected, and the like. The FOTA agent may receive and install the firmware update after the FOTA server confirms the SIM eligibility. In some instances, the UE 200 may detect a new SIM card for switching to a new carrier. If the new SIM card is detected after a firmware update was successfully installed, the FOTA agent may send a firmware check to the FOTA server. If the FOTA agent receives a failed SIM eligibility check, the FOTA agent may display a notification to request a SIM profile update from the associated carrier. In additional and/or alternative examples, if a new SIM card is detected and the FOTA server denies SIM eligibility, the FOTA agent may determine to roll back to a previous firmware version.

In some examples, the OTA agent component 212 may configure some features of the communication client based on the capability set of the UE. As described herein, the FOTA agent may upgrade or downgrade the firmware, which may enable or disable function calls for device features. Accordingly, the OTA agent component 212 may enable or disable features of the communication client, including changing a communication type.

In various examples, the OTA agent component 212 may generate a user interface to send and receive updated communication data. The user interface may be configured to send and receive update confirmation and may display notifications from the OTA servers.

In some embodiments, the processor(s) 202 is a central processing unit (CPU), a graphics processing unit (GPU), or both CPU and GPU, or other processing unit or component known in the art.

The UE 200 also includes additional data storage devices (removable and/or non-removable) such as, for example, magnetic disks, optical disks, or tape. Such additional storage is illustrated in FIG. 2 by removable storage 214 and non-removable storage 216. Tangible computer-readable media can include volatile and non-volatile, removable and non-removable media implemented in any method or technology for storage of information, such as computer-readable instructions, data structures, program modules, or other data. Memory 204, removable storage 214, and non-removable storage 216 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the UE 200. Any such tangible computer-readable media can be part of the UE 200.

In various embodiments, the UE 200 can include applications including but are not limited, a web browser application, a video streaming application, an online gaming application, a network analyzer, and the like. During execution on the UE 200, each of the applications may be configured to cause the UE 200 to initiate communications with a network node (e.g., carrier server 300) over the network(s) 108.

The UE 200 may be configured to communicate over a telecommunications network using any common wireless and/or wired network access technology. Moreover, the UE 200 may be configured to run any compatible device operating system (OS), including but not limited to, Microsoft Windows Mobile, Google Android, Apple iOS, Linux Mobile, as well as any other common mobile device OS.

The UE 200 also can include input device(s) 218, such as a keypad, a cursor control, a touch-sensitive display, voice input device, etc., and output device(s) 220 such as a display, speakers, printers, etc. These devices are well known in the art and need not be discussed at length here.

As illustrated in FIG. 2, the UE 200 also includes one or more wired or wireless transceiver(s) 222. For example, the transceiver(s) 222 can include a network interface card (NIC), a network adapter, a LAN adapter, or a physical, virtual, or logical address to connect to the various network(s) 108, or to the network device (e.g., carrier server 300), for example. To increase throughput when exchanging wireless data, the transceiver(s) 222 can utilize multiple-input/multiple-output (MIMO) technology. The transceiver(s) 222 can comprise any sort of wireless transceivers capable of engaging in wireless, radio frequency (RF) communication. The transceiver(s) 222 can also include other wireless modems, such as a modem for engaging in Wi-Fi, WiMax, Bluetooth, infrared communication, and the like.

In some examples, the UE 200 can be implemented as the UE 102, including the OTA agent component 212.

Figure 3:
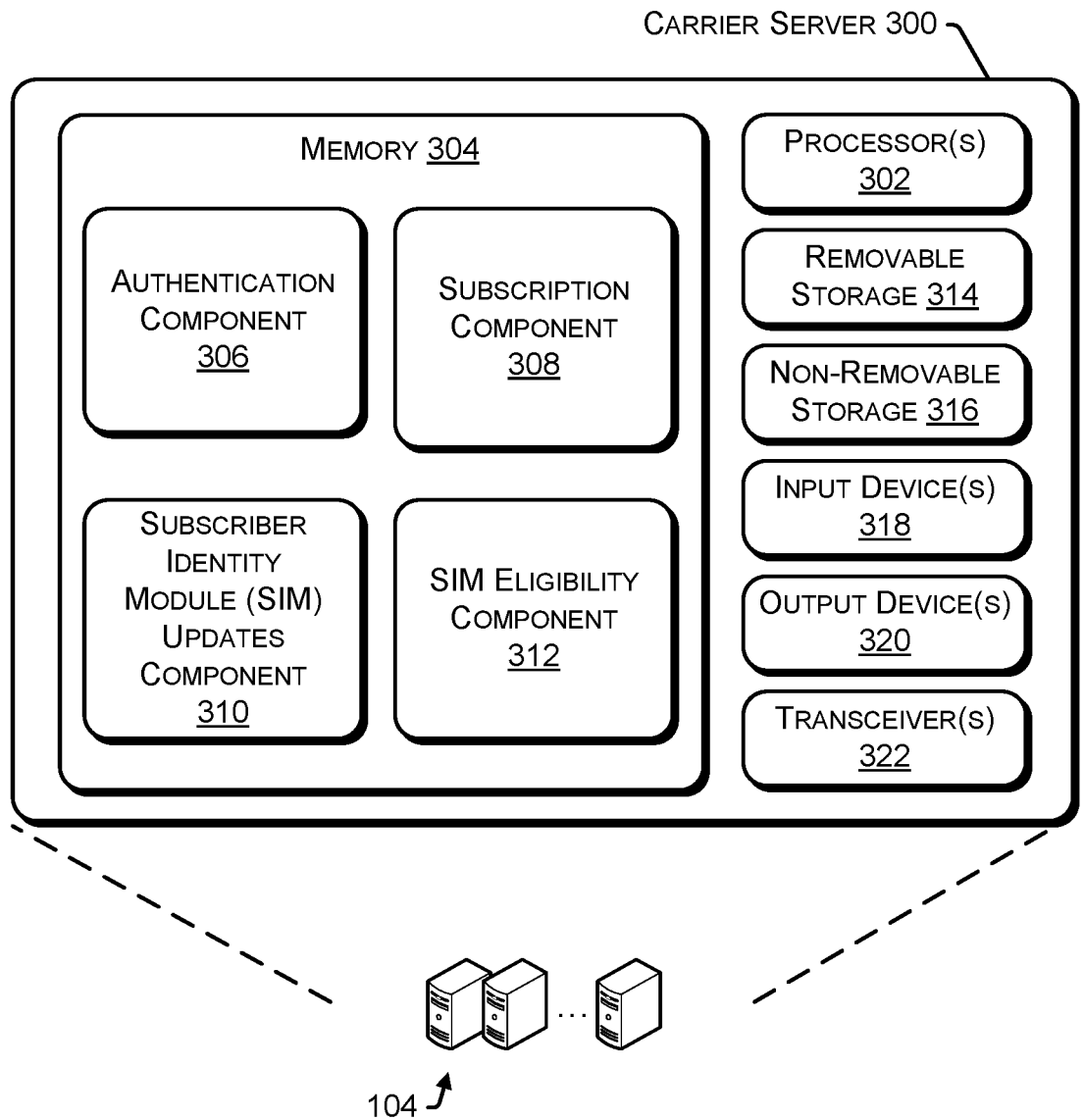
FIG. 3 is a block diagram of a carrier server configured to control software OTA updates based on SIM eligibility.
Figure 4:
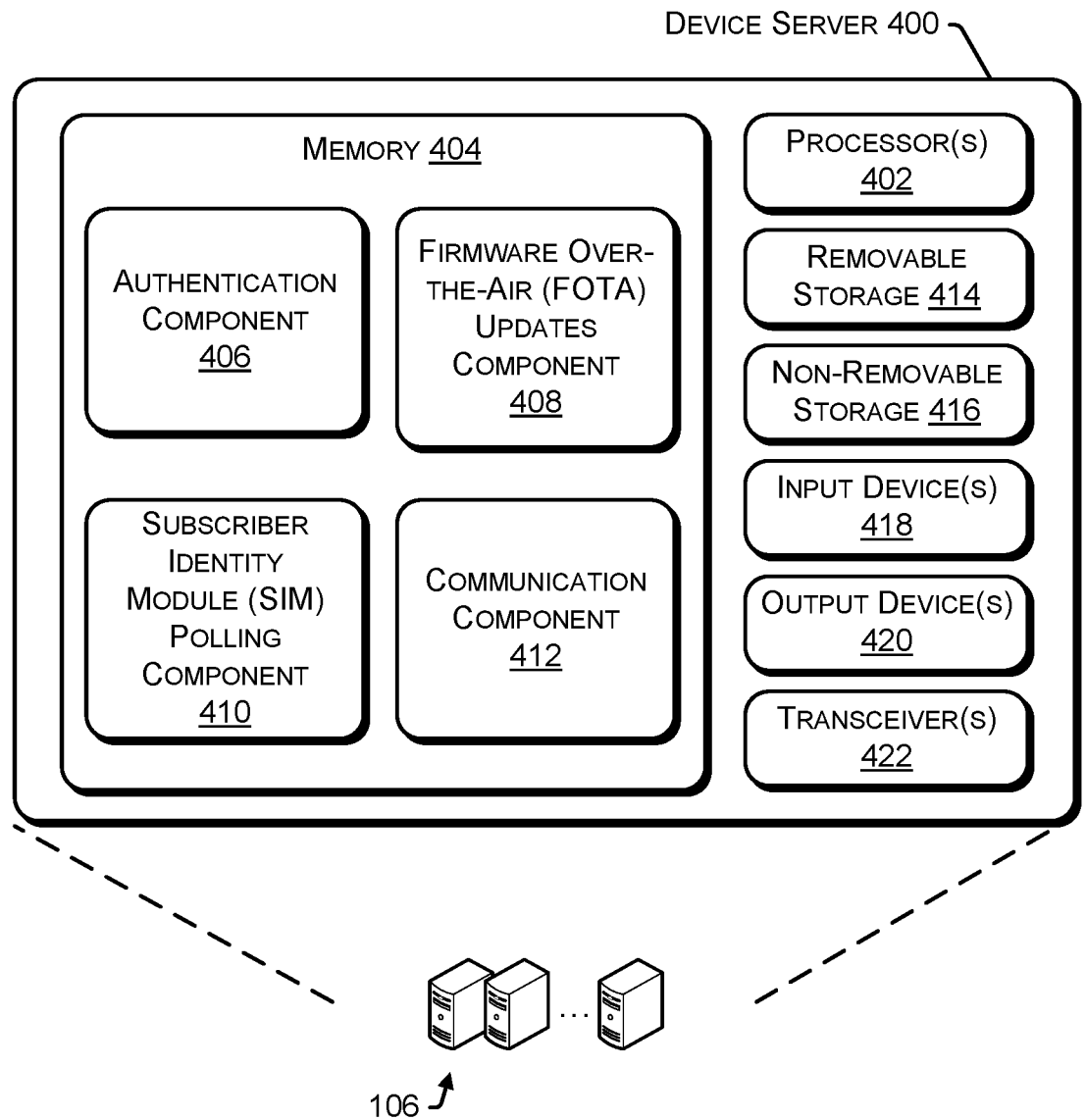
FIG. 4 is a block diagram of a device server configured to control software OTA updates based on SIM eligibility.

FIG. 3 is a block diagram of a carrier server 300, and FIG. 4 is a block diagram of a device server 400 configured to control software OTA updates based on SIM eligibility. In some examples, the carrier server 300 and the device server 400 can be configured to implement the techniques discussed herein.

In various examples, the carrier server 300 may include processor(s) 302 and memory 304, and the device server 400 may include processor(s) 402 and memory 404. Depending on the exact configuration and type of computing device, the memory 304 and 404 may be volatile (such as RAM), non-volatile (such as ROM, flash memory, etc.) or some combination of the two.

FIG. 3 shows only basic, high-level components of the carrier server 300. Generally, the carrier server 300 may comprise and/or may be implemented in any of various network components discussed herein, including those components illustrated in FIG. 1. For example, the carrier server 300 may be implemented in the carrier server(s) 104, the network(s) 108, or other network devices.

The memory 304 may include an authentication component 306, a subscription component 308, a subscriber identity module (SIM) updates component 310, and a SIM eligibility component 312.

The authentication component 306 can include functionality to identify and/or authenticate UEs, user devices, network devices, OTA servers, and/or any other communications components to interact with the network. The authentication component 306 may receive requests to initiate the UE. The authentication component 306 may authorize the UE to connect to the network by determining that the UE is associated with a 5G SA subscription. The authentication component 306 may grant authorization for the services that the UE is allowed to access based on subscription data (e.g., roaming restrictions, access type, and RAT type currently in use) is evaluated once the UE is successfully identified and authenticated. This authorization may be executed during a UE registration procedure.

The authentication component 306 may call the subscription component 308 to retrieve data from a subscriber database, data repository, and/or any other database to verify a subscriber account and/or associated UE is authorized to use the services provided by the carrier server 300.

The subscription component 308 can collect data associated with a subscriber in a subscriber database. In some examples, the subscription component 308 may include a unified data repository (UDR). The UDR may be a common data repository of subscriber information and can be used to service network functions and/or used to determine the service available to a subscriber. The common data repository can be a shared database providing support for 2G/3G/4G/5G core and can store subscriber related data, including subscriber information.

The subscription component 308 may maintain a subscriber database with associated SIM data to support OTA updates. The subscription component 308 can collect data associated with subscribers, subscriber sessions, and/or registrations in the subscriber database. In various examples, the subscription component 308 may utilize a common data repository, a shared database providing support for 2G/3G/4G/5G core, to store subscriber related data, including subscriber information. The subscription component 308 may collect and store information specific to the subscriber accounts and subscription, including one or more of: username, account identifier, subscription, services, and the like. The subscription component 308 can also collect information specific to a UE associated with a subscriber account, including a device type, a device identifier, communications capabilities, and the like. The subscription component 308 may receive information from the UE including one or more of: Subscriber Identity Module (SIM), SIM profile, Mobile Station International Subscriber Directory Number (MSISDN), an International Mobile Subscriber Identity (IMSI), International Mobile Equipment Identity (IMEI), and the like.

The subscription component 308 may collect and store information specific to the subscriber accounts and subscription, including one or more of: authorized user(s), username(s), account identifier, subscription, and the like. The subscription component 308 can also collect information specific to one or more UEs associated with a subscriber account, including a device type, a device identifier, communications capabilities, and the like. The subscription component 308 may receive information from the UE including one or more of: Subscriber Identity Module (SIM), SIM profile, Mobile Station International Subscriber Directory Number (MSISDN), an International Mobile Subscriber Identity (IMSI), International Mobile Equipment Identity (IMEI), and the like.

The subscription component 308 may receive a subscribe request to poll the capabilities of a recipient UE, as discussed herein. The subscribe request may include information to identify the recipient UE, including one or more of: account identifier, username, Mobile Station International Subscriber Directory Number (MSISDN), an International Mobile Subscriber Identity (IMSI), and the like. The subscription component 308 may receive a subscribe request for the recipient UE and may poll the recipient UE for communication capabilities based on the associated communication client and/or SIM profile. For instance, the subscription component 308 may receive the request and send a poll to the UE to check the communication capabilities based on the current software and firmware. In response to receiving the communication capabilities, the subscription component 308 may update any stored information associated with the UE and/or send a notify response with the communication capabilities to the originating UE.

The SIM updates component 310 may include functions to provide SIM OTA updates. In some examples, the SIM updates component 310 can correspond to the SIM updates component 112 of FIG. 1. As described herein with respect to the SIM updates component 112, the SIM updates component 310 may receive a SIM update and determine a list of eligible devices from the database based in part on the device type and/or subscription information. The SIM updates component 310 may push the SIM update to the list of eligible devices. In some examples, the SIM updates component 310 may receive update confirmations from the devices and store the associated SIM identifiers for the SIM eligibility component 312.

The SIM eligibility component 312 may include functions to receive and respond to SIM eligibility checks. In some examples, the SIM eligibility component 312 can correspond to the SIM eligibility component 114 of FIG. 1. As described herein with respect to the SIM eligibility component 114, the SIM eligibility component 312 may configure a web service to expose a network API for third-party requesting servers. The SIM eligibility component 312 can receive, via the network API, input polling data, and the SIM eligibility component 312 can output the polling results. In various examples, the input polling data may indicate the polling mode and/or query data. The query data may include one or more of: a device type and/or device group, a feature identifier, a SIM identifier, a timestamp, an authentication key, and the like. The SIM eligibility component 312 may access and query the subscriber database for SIM profiles that indicates support for the device type and/or device group and the feature identifier. In response to the eligible SIM poll, the SIM eligibility component 312 may generate an eligible SIM output. If the poll is in batch polling mode, the SIM eligibility component 312 may determine eligibility status for devices in the device group and generate a list of eligible SIMS as the eligible SIM output. If the poll is in instance polling mode and/or SIM card change mode, the SIM eligibility component 312 may determine eligibility status for a device associated with the SIM identifier and generate a Boolean response (e.g., TRUE or FALSE) and/or a "list" of a single or none eligible SIM as the eligible SIM output. The SIM eligibility component 312 may return the eligible SIM output to the requesting server.

In some examples, the processor(s) 302 and 402 is a central processing unit (CPU), a graphics processing unit (GPU), both CPU and GPU, or other processing unit or component known in the art. Furthermore, the processor(s) 302 and 402 may include any number of processors and/or processing cores. The processor(s) 302 and 402 is configured to retrieve and execute instructions from memory 304 and 404, respectively.

The memory 304 and 404 can also be described as non-transitory computer-readable media or machine-readable storage memory and may include removable and non-removable media implemented in any method or technology for storage of information, such as computer-executable instructions, data structures, program modules, or other data.

The memory 304 and 404 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The carrier server 300 and device server 400 also includes additional data storage devices (removable and/or non-removable) such as, for example, magnetic disks, optical disks, or tape. Such additional storage is illustrated in FIGS. 3 and 4 by removable storage 314 and 414, and non-removable storage 316 and 416. Tangible computer-readable media can include volatile and non-volatile, removable and non-removable media implemented in any method or technology for storage of information, such as computer-readable instructions, data structures, program modules, or other data. The memory 304 and 404, the removable storage 314 and 414, and the non-removable storage 316 and 416 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the corresponding carrier server 300 and/or device server 400. Any such tangible computer-readable media can be part of the carrier server 300 and device server 400.

The memory 304 and 404, the removable storage 314 and 414, and/or the non-removable storage 316 and 416 may in some cases include storage media used to transfer or distribute instructions, applications, and/or data. In some cases, the memory 304 and 404, the removable storage 314 and 414, and/or the non-removable storage 316 and 416 may include data storage that is accessed remotely, such as network-attached storage that the corresponding carrier server 300 and/or device server 400 accesses over some type of data communications network.

In various examples, any or all of the memory 304, the removable storage 314, and/or the non-removable storage 316 may store programming instructions that, when executed, implement some or all of the function functionality described herein.

The carrier server 300 also can include input device(s) 318, such as a keypad, a cursor control, a touch-sensitive display, voice input device, etc., and output device(s) 320 such as a display, speakers, printers, etc. These devices are well known in the art and need not be discussed at length here.

As illustrated in FIGS. 3 and 4, the carrier server 300 and the device server 400 also include one or more wired or wireless transceiver(s) 322 and 422, respectively. For example, the transceiver(s) 322 and 422 can include a network interface card (NIC), a network adapter, a LAN adapter, or a physical, virtual, or logical address to connect to various networks, devices, or components illustrated in figures herein. To increase throughput when exchanging wireless data, the transceiver(s) 322 and 422 can utilize multiple-input/multiple-output (MIMO) technology. The transceiver(s) 322 and 422 can comprise any sort of wireless transceivers capable of engaging in wireless, radio frequency (RF) communication. The transceiver(s) 322 and 422 can also include other wireless modems, such as a modem for engaging in Wi-Fi, WiMAX, Bluetooth, infrared communication, and the like.

In some examples, the carrier server 300 can be implemented as the carrier server(s) 104 of FIG. 1, including the SIM updates component 112 and/or the SIM eligibility component 312.

FIG. 4 is a block diagram of a device server 400 configured to control software OTA updates based on SIM eligibility.

FIG. 4 shows only basic, high-level components of the device server 400. Generally, the device server 400 may comprise and/or may be implemented in any of various network components discussed herein, including those components illustrated in FIG. 1. For example, the device server 400 may be implemented in the device servers(s) 106, the network(s) 108, or other network devices.

In various examples, the device server 400 may include processor(s) 402 and memory 404. Depending on the exact configuration and type of computing device, the memory 404 may be volatile (such as RAM), non-volatile (such as ROM, flash memory, etc.) or some combination of the two. The memory 404 may include an authentication component 406, a firmware over-the-air updates component 408, a subscriber identity module (SIM) polling component 410, and a communication component 412.

The authentication component 406 can include functionality to identify and/or authenticate UEs, user devices, network devices, and/or any other communications components to interact with the network. The authentication component 406 may receive network connection requests from a UE. The authentication component 406 may authorize the UE to connect to the network by determining that the UE had a valid authorization key and/or that the UE is a device manufactured by the present device manufacturer. The authentication component 406 may grant authorization for the services that the UE is allowed to access based on the UE device type after the UE is successfully identified and authenticated. For instance, the device server 400 may be associated with a device manufacturer of the UE, and the authentication component 406 automatically detect that the UE is a device made by the manufacturer and/or authenticate the UE to request access to firmware updates and/or other services that the device server 400 provides.

The FOTA updates component 408 may include functions to provide firmware updates. In some examples, the FOTA updates component 408 can correspond to the FOTA updates component 116 of FIG. 1. As described herein with respect to the FOTA updates component 116, the FOTA updates component 408 may receive and distribute firmware updates to eligible devices. In some examples, the FOTA updates component 408 may receive a firmware update for a device group from device developers associated with the device manufacturer. The device group may include one or more devices grouped by one or more grouping scheme, including device type, device model, device family, region, carrier, and the like. The firmware update may enable and/or upgrade one or more device features (e.g., enable 5G SA mode). In various examples, the FOTA updates component 408 may send notifications of available updates to the FOTA agent on devices from the device group.

The FOTA updates component 408 may receive requests for firmware updates from the FOTA agent. Before sending out the firmware, the FOTA updates component 408 may call the SIM polling component 410 to connect with a carrier server to determine whether a device is associated with a SIM profile with support for one or more device features.

The SIM polling component 410 may include functions to connect with a carrier server to determine whether a SIM profile indicates support for the one or more device features. In some examples, the SIM polling component 410 can correspond to the SIM polling component 118 of FIG. 1. As described herein with respect to the SIM polling component 118, the SIM polling component 410 may include functions to connect with a network node of a service provider and perform SIM profile checks. As described herein, the network node may include a network API that the SIM polling component 410 can call to perform the SIM profile checks. The SIM polling component 410 may include different operating modes that trigger the SIM profile checks. The different operating modes may be triggered based on batch polling, instance polling, and SIM card change.

In some examples, the SIM polling component 410 may perform the SIM profile checks based on batch polling. In batch polling mode, the SIM polling component 410 may transmit a batch polling request to the carrier server(s) 104 to request an updated eligible list of SIMS ("allowed-list") and the polling may be repeated on a predetermined polling cycle (e.g., every 12 hours, daily, weekly, etc.). The batch polling request may be transmitted with query data indicating the one or more device features to verify support for. In some examples, the SIM polling component 410 may transmit, to a carrier server, an eligible subscriber identity modules (SIMS) poll request with query data that defines parameters to query for a list of eligible SIMS and one or more eligibility criteria. In various examples, the query data and/or eligibility criteria may include prerequisite SIM data. In additional and/or alternative examples, the query data and/or eligibility criteria may include one or more of: the device type, the feature identifier, the timestamp, and the like. In response to the batch polling request, the SIM polling component 410 may receive, from the carrier server, the "allowed-list," including the list of eligible SIMS. When the FOTA agent on a device sends a firmware update check with an associated SIM identifier, the SIM polling component 410 may receive the firmware update check and determine whether the SIM identifier is on the allowed-list. In additional examples, the firmware update check may also include an installed firmware version, and the SIM polling component 410 may determine whether the available firmware update is a newer version than the installed firmware version before transmitting the update. In response to determining that the SIM identifier is on the allowed-list and/or a new firmware version is available, the FOTA updates component 408 may transmit the firmware update to the device.

In various examples, the SIM polling component 410 may perform the SIM profile checks based on instance polling. In some examples, a FOTA agent on the device may send a firmware check request to the FOTA updates component 116 based on one or more triggers, including a weekly update check, notification of the available update, a new SIM card detection, and the like. The firmware update request may include subscriber identity module (SIM) data and software version. In instance polling mode, the SIM polling component 410 may poll the carrier server to request a particular SIM profile check in response to a request from a particular device. Like batch polling, the instance polling request may be transmitted with query data. The query data may further include the particular SIM identifier (e.g., International Mobile Subscriber Identity (IMSI)) to check. In response to the instance polling request, the SIM polling component 410 may receive, from the carrier server, a device eligibility status (e.g., TRUE or FALSE) indicating whether the particular SIM identifier is eligible for the firmware update. If the device eligibility status is affirmative, the FOTA updates component 408 may transmit the firmware update to a FOTA agent on the particular device.

In various examples, the SIM polling component 410 may perform the SIM profile check based on a SIM card change. In SIM card change mode, the particular device has the latest firmware installed after an eligible SIM check, but a user of the device installs a new SIM card associated with a new carrier. The new SIM card includes a different SIM profile that may or may not indicate support for the device features enabled by the latest firmware. In some examples, the SIM polling component 410 has to verify infrastructure support with the new carrier before the device executes the currently installed firmware, which could lock the device. In response to the new SIM card detection, the FOTA agent on the device may send a firmware check request to the FOTA updates component 408. The SIM polling component 410 may send an instance polling request to a new carrier server associated with the new carrier.

In various examples, the SIM polling component 410 may include functions to handle a new SIM profile that is unable to support the latest firmware install. In some examples, if the new carrier server returns an indication that the SIM identifier is not eligible for the currently installed firmware, the FOTA updates component 408 may return a message to the FOTA agent to notify the user of firmware incompatibility and request a SIM update. In an additional and/or alternative example, the FOTA updates component 408 may determine that the new carrier network does not have the infrastructure to support the device features enabled by currently installed firmware and may cause the FOTA agent to trigger a reinstall of a previous version. In various examples, the FOTA updates component 408 may cause the FOTA agent to trigger a "safe mode," with minimal features enabled, version of the firmware to execute.

The communication component 412 may include functions to communicate with a device. The communication component 412 may include functions to establish a network socket connection with the device to receive update requests and transmit the update and/or notifications related to the update. In various examples, the communication component 412 may generate notifications for new update availability and push the notification to devices belonging to a device group. In some examples, the communication component 412 may generate notifications related to requests for SIM updates based on the SIM eligibility status and transmit the notification to a requesting device.

In some examples, the device server 400 can be implemented as the device server(s) 106, including the FOTA updates component 116 and/or the SIM polling component 118.

Figure 5:
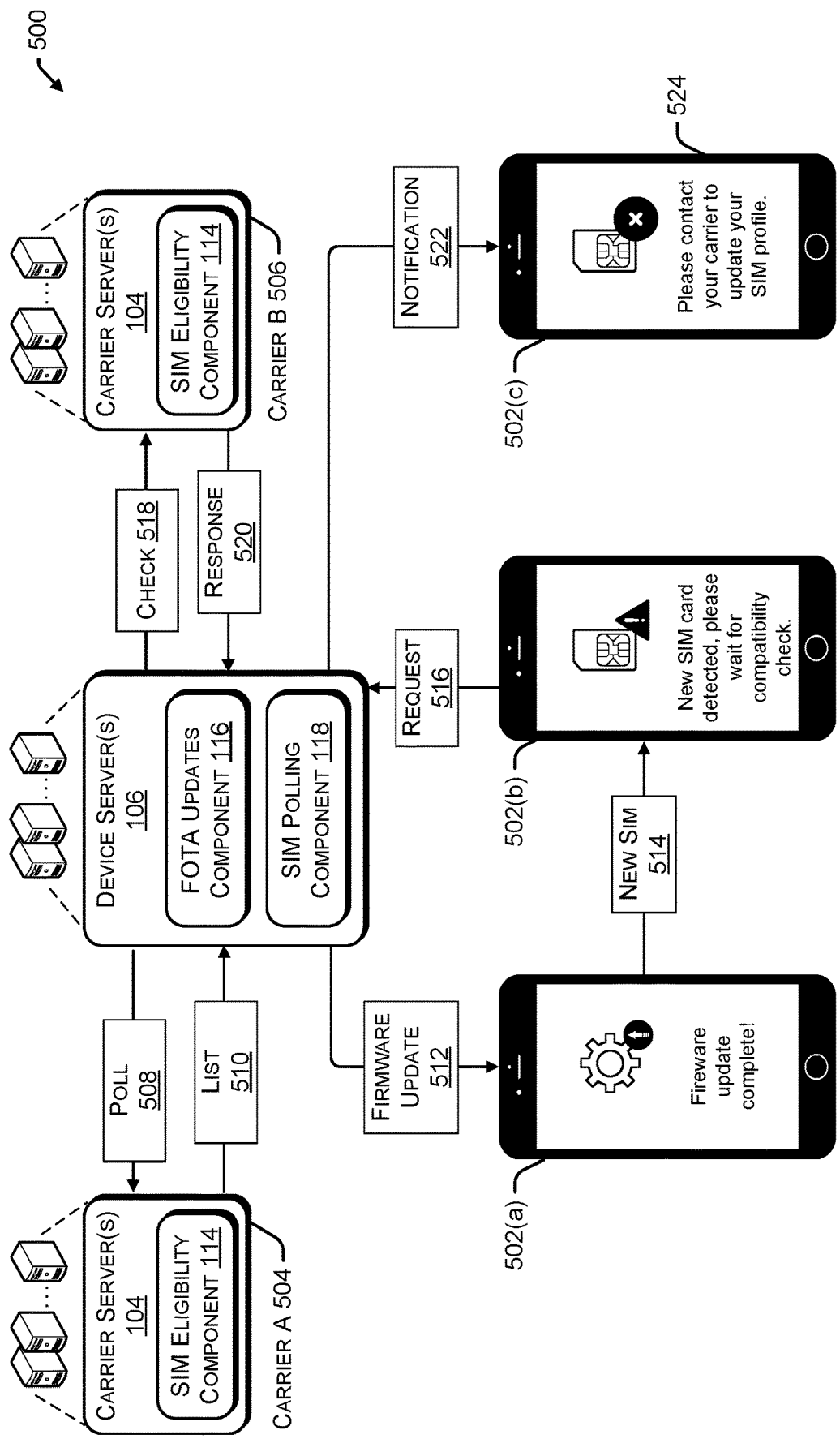
FIG. 5 is a schematic diagram showing an example system including servers and user equipment (UE) with example UE states for controlling software OTA updates.

FIG. 5 is a schematic diagram showing an example system 500 including servers and a UE with example UE states for controlling software OTA updates. An example UE 502 can be implemented as the UE 102(1), and the OTA agent component 110 may include a FOTA agent to interact with the servers to cause the example UE states 502(a), 502(b), and 502(c). The servers can include the device server(s) 106 and a first carrier server(s) 104 associated with an example Carrier A 504 and a second carrier server(s) 104 associated with an example Carrier B 506. The example UE state 502(a) illustrates the example UE 502 with a SIM card for the example Carrier A 504, and the example UE states 502(b) and 502(c) illustrates the example UE 502 with a SIM card for the example Carrier B 506.

As a non-limiting example, the device server(s) 106 may transmit an example batch poll 508 to the example Carrier A 504 and receive an example list of eligible SIMS 510. The device server(s) 106 may determine the example UE 502 is included in the example list of eligible SIMS 510 and may transmit an example firmware update 512. The example UE state 502(a) illustrates an example state after installing the example firmware update 512. In some instances, a user for the example UE 502 may decide to switch to a new carrier by installing a new SIM card.

For instance, the OTA agent component 110 may detect an example new SIM card 514 for switching the UE from the example Carrier A 504 to the example Carrier B 506 and causing the UE 502 to be in the example UE state 502(b). In the present example, the example new SIM card 514 was detected after the example firmware update 512 was successfully installed, and the OTA agent component 110 may send an example firmware check request 516 to the device server(s) 106.

In response to the example firmware check request 516, the device server(s) 106 may perform an example SIM profile check 518 by sending an instance polling request to the second carrier server(s) 104 associated with the example Carrier B 506. The second carrier server(s) 104 returns an example response 520 indicating that the SIM profile associated with the example new SIM card 514 does not support the features enabled by the example firmware update 512. In response to determining the example new SIM card 514 is not eligible for the currently installed firmware, the FOTA updates component 116 generates and returns an example notification message 522 to the example UE 502. The OTA agent component 110 receives a failed SIM eligibility check with the example notification message 522. The OTA agent component 110 may cause the example UE 502 to be in the example UE state 502(c) and display the example notification message 522 to request a SIM profile update from the example Carrier B 506.

Figure 6:
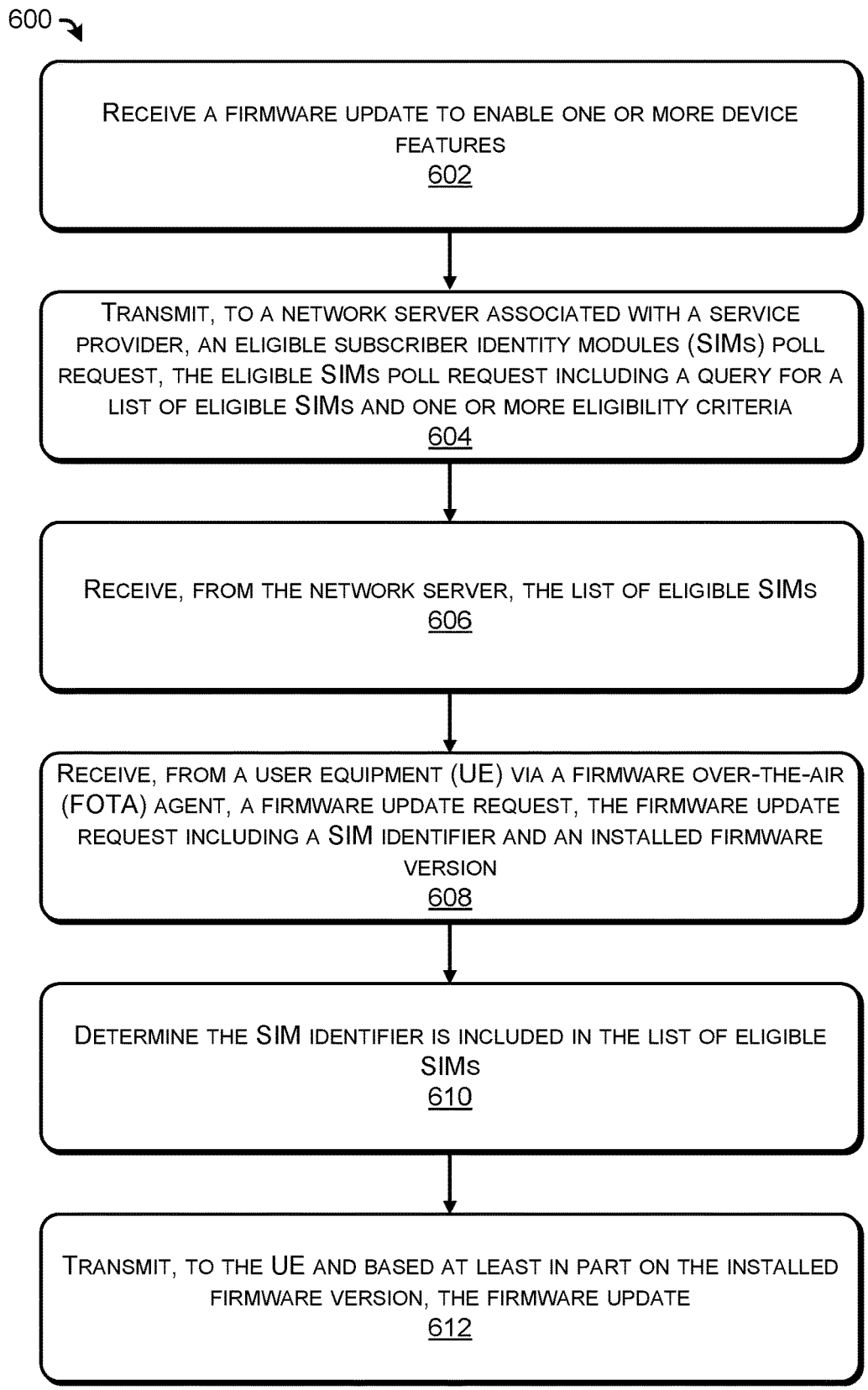
FIG. 6 illustrates an example process for controlling software OTA updates based on SIM eligibility.
Figure 7:
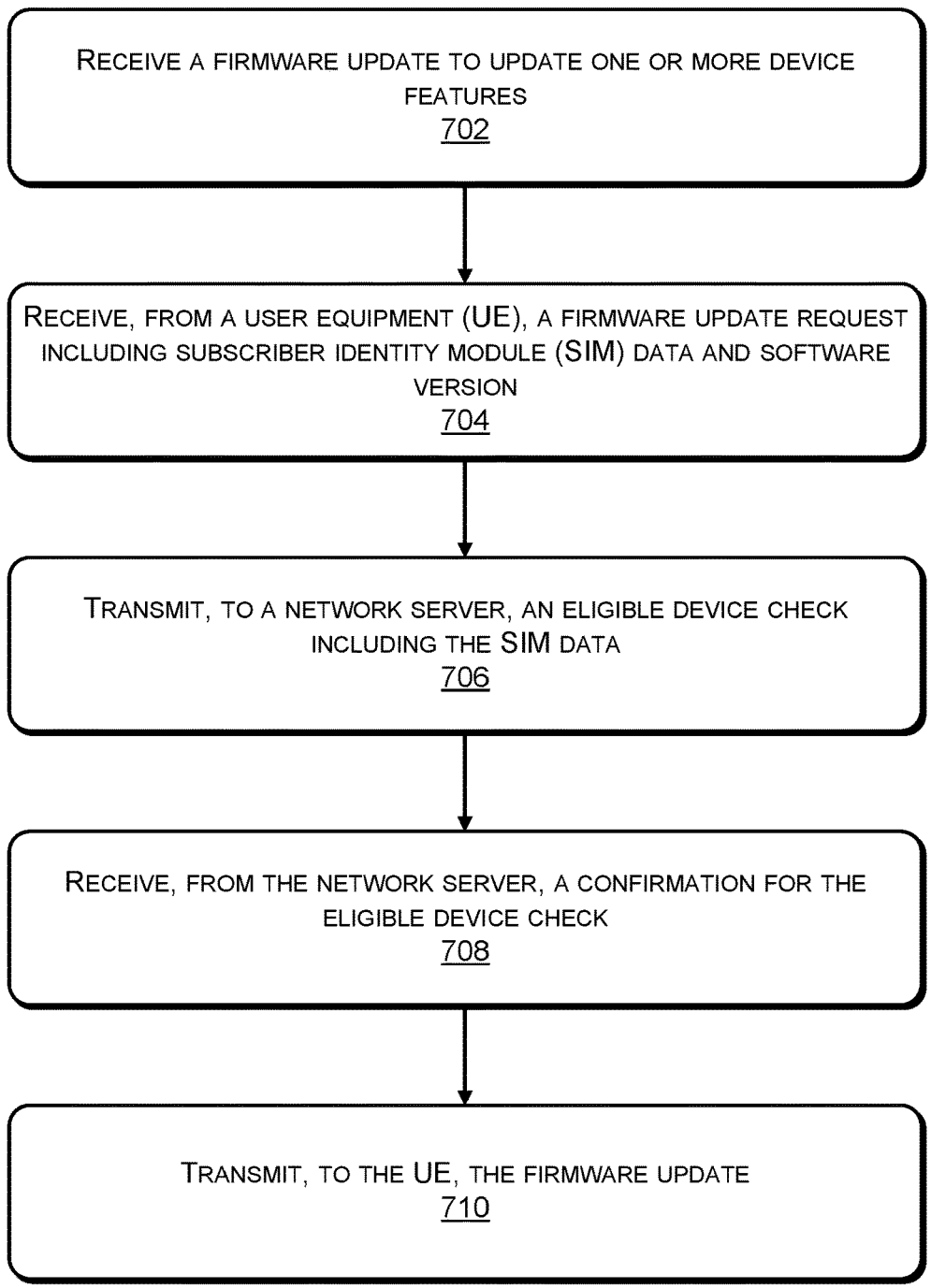
FIG. 7 illustrates another example process for controlling software OTA updates based on SIM eligibility.

FIGS. 6 and 7 illustrate example processes and sequence diagrams in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

FIG. 6 illustrates an example process 600 for controlling software OTA updates based on SIM eligibility. The example process 600 can be performed by the device server(s) 106 and/or by the device server 400 comprising the FOTA updates component 408, the SIM polling component 410, or another component or device as discussed herein.

At operation 602, the process can include receiving a firmware update to enable one or more device features. As described herein, the system may configure a FOTA server to receive a firmware update for a device group from device developers associated with the device manufacturer. The device group may include one or more devices grouped by one or more grouping scheme, including device type, device model, device family, region, carrier, and the like. The firmware update may enable and/or upgrade one or more device features (e.g., enable 5G SA mode). In various examples, the FOTA server may send notifications of available updates to the FOTA agent on devices from the device group.

At operation 604, the process can include transmitting, to a network server associated with a service provider, an eligible subscriber identity modules (SIMS) poll request, the eligible SIMs poll request including a query for a list of eligible SIMs and one or more eligibility criteria. As described herein, the FOTA server may connect with a carrier server to determine whether a device is associated with a SIM profile with support for one or more device features. The FOTA server may connect with a network node of a service provider and perform SIM profile checks. The network node may include a network API that the FOTA server can call to perform the SIM profile checks. The SIM profile checks may include different operating modes that trigger the checks. The different operating modes may be triggered based on batch polling, instance polling, and SIM card change. In the present example, the FOTA server can perform the SIM profile checks based on batch polling. In batch polling mode, the FOTA server may transmit a batch polling request to the network node to request an updated eligible list of SIMs ("allowed-list") and the polling may be repeated on a predetermined polling cycle (e.g., every 12 hours, daily, weekly, etc.). The batch polling request may be transmitted with query data indicating the one or more device features to verify support for. In some examples, the FOTA server may transmit, to a carrier server, an eligible subscriber identity modules (SIMS) poll request with query data that defines parameters to query for a list of eligible SIMS and one or more eligibility criteria. In various examples, the query data and/or eligibility criteria may include prerequisite SIM data. In additional and/or alternative examples, the query data and/or eligibility criteria may include one or more of: the device type, the feature identifier, the timestamp, and the like. In response to the batch polling request, the FOTA server may receive, from the carrier server, the "allowed-list," including the list of eligible SIMS. When the FOTA agent on a device sends a firmware update check with an associated SIM identifier, the FOTA server may check if the SIM identifier is on the allowed-list. In response, if the check is affirmative, the FOTA server may transmit the update to the device.

At operation 606, the process can include receiving, from the network server, the list of eligible SIMS. As described herein, the FOTA server may receive, from the carrier server, the "allowed-list," including the list of eligible SIMS. When the FOTA agent on the device sends a firmware update check with an associated SIM identifier, the FOTA server may receive the firmware update check and determine whether the SIM identifier is on the allowed-list.

At operation 608, the process can include receiving, from a user equipment (UE) via a firmware over-the-air (FOTA) agent, a firmware update request, the firmware update request including a SIM identifier and an installed firmware version. As described herein, the FOTA server may receive the firmware update check and determine whether the SIM identifier is on the allowed-list. In additional examples, the firmware update check may also include an installed firmware version, and the FOTA server may determine whether the available firmware update is a newer version than the installed firmware version before transmitting the update. In response, if the check is affirmative, the FOTA server may transmit the firmware update to the device.

At operation 610, the process can include determining the SIM identifier is included in the list of eligible SIMS. As described herein, the FOTA server may receive, from the carrier server, the "allowed-list," including the list of eligible SIMS. When the FOTA agent on a device sends a firmware update check with an associated SIM identifier, the FOTA server may receive the firmware update check and determine whether the SIM identifier is on the allowed-list.

At operation 612, the process can include transmitting, to the UE and based at least in part on the installed firmware version, the firmware update. As described herein, the firmware update check may also include an installed firmware version, and the FOTA server may determine whether the available firmware update is a newer version than the installed firmware version before transmitting the update. In response to determining that the SIM identifier is on the allowed-list and/or a new firmware version is available, the FOTA server may transmit the firmware update to the device.

FIG. 7 illustrates another example process 700 for controlling software OTA updates based on SIM eligibility. The example process 700 can be performed by the device server(s) 106 and/or by the device server 400 comprising the FOTA updates component 408, the SIM polling component 410, or another component or device as discussed herein.

At operation 702, the process can include receiving a firmware update to update one or more device features. As described herein, the system may configure a FOTA server to receive a firmware update for a device group from device developers associated with the device manufacturer. The device group may include one or more devices grouped by one or more grouping scheme, including device type, device model, device family, region, carrier, and the like. The firmware update may enable and/or upgrade one or more device features (e.g., enable 5G SA mode). In various examples, the FOTA server may send notifications of available updates to the FOTA agent on devices from the device group.

At operation 704, the process can include receiving, from a user equipment (UE), a firmware update request including subscriber identity module (SIM) data and software version. As described herein, a FOTA agent on the device may send a firmware check request to the FOTA server based on one or more triggers, including a weekly update check, a notification of the available update, a new SIM card detection, and the like. The firmware update request may include subscriber identity module (SIM) data and software version.

At operation 706, the process can include transmitting, to a network server, an eligible device check including the SIM data. As described herein, the FOTA server may connect with a carrier server to determine whether a device is associated with a SIM profile with support for one or more device features. The FOTA server may connect with a network node of a service provider and perform SIM profile checks. The network node may include a network API that the FOTA server can call to perform the SIM profile checks. The SIM profile checks may include different operating modes that trigger the checks. The different operating modes may be triggered based on batch polling, instance polling, and SIM card change. In the present example, the FOTA server can perform the SIM profile checks based on batch polling. In batch polling mode, the FOTA server may transmit a batch polling request to the network node to request an updated eligible list of SIMS ("allowed-list") and the polling may be repeated on a predetermined polling cycle (e.g., every 12 hours, daily, weekly, etc.). The batch polling request may be transmitted with query data indicating the one or more device features to verify support for. In some examples, the FOTA server may transmit, to a carrier server, an eligible subscriber identity modules (SIMS) poll request with query data that defines parameters to query for a list of eligible SIMS and one or more eligibility criteria. In instance polling mode, the FOTA server may poll the carrier server to request a particular SIM profile check in response to a request from a particular device. Like batch polling, the instance polling request may be transmitted with query data. The query data may further include the particular SIM identifier (e.g., International Mobile Subscriber Identity (IMSI)) to check. In response to the instance polling request, the FOTA server may receive, from the carrier server, a device eligibility status (e.g., TRUE or FALSE) indicating whether the particular SIM identifier is eligible for the firmware update. If the device eligibility status is affirmative, the FOTA server may transmit the firmware update to a FOTA agent on the particular device.

At operation 708, the process can include receiving, from the network server, a confirmation for the eligible device check. As described herein, the FOTA server may receive, from the carrier server, a device eligibility status (e.g., TRUE or FALSE) indicating whether the particular SIM identifier is eligible for the firmware update. If the device eligibility status is affirmative, the FOTA server may transmit the firmware update to a FOTA agent on the particular device.

At operation 710, the process can include transmitting, to the UE, the firmware update. As described herein, if the device eligibility status is affirmative, the FOTA server may transmit the firmware update to a FOTA agent on the particular device.

CONCLUSION

Although features and/or methodological acts are described above, it is to be understood that the appended claims are not necessarily limited to those features or acts. Rather, the features and acts described above are disclosed as example forms of implementing the claims.

What is claimed is:

1. One or more non-transitory computer-readable media storing computer executable instructions that, when executed, cause one or more processors to perform operations comprising:

receiving a firmware update to enable one or more device features;

at a first time, transmitting, to a network server associated with a service provider, a first eligible subscriber identity modules (SIMs) poll request, the first eligible SIMs poll request including a first query for a first list of eligible SIMs and one or more eligibility criteria, the one or more eligibility criteria including support indicated for the one or more device features;

receiving, from the network server, the first list of eligible SIMs;

receiving, from a user equipment (UE) via a firmware over-the-air (FOTA) agent, a firmware update request, the firmware update request including a SIM identifier and an installed firmware version;

determining that the SIM identifier is not included in the first list of eligible SIMs, the SIM identifier being associated by the service provider with a first SIM profile;

at a second time later than the first time, transmitting, to the network server associated with the service provider, a second eligible SIMs poll request, the second eligible SIMs poll request including a second query for a second list of eligible SIMs and the one or more eligibility criteria;

receiving, from the network server, the second list of eligible SIMs;

determining that the SIM identifier is included in the second list of eligible SIMs, wherein the SIM identifier is associated by the service provider with a second SIM profile, reflecting a SIM profile update; and in response to determining that the SIM identifier is included in the second list of eligible SIMs, transmitting, to the UE the firmware update.

2. The one or more non-transitory computer-readable media of claim 1, wherein the SIM identifier includes an International Mobile Subscriber Identity (IMSI).

3. The one or more non-transitory computer-readable media of claim 1, wherein the UE is associated with a 5G Standalone (SA) subscription for the service provider, the UE is a 5G Standalone (SA) capable device, and the one or more device features includes at least one 5G SA capability.

4. The one or more non-transitory computer-readable media of claim 1, wherein the one or more eligibility criteria includes one or more required SIM data and the one or more required SIM data includes at least one of a Subscription Concealed Identifier (SUCI), a Subscription Permanent Identifier (SUPI), or a particular authentication key.

5. The one or more non-transitory computer-readable media of claim 1, wherein the operations further comprise:

determining a time lapse meets or exceeds a predetermined polling cycle, wherein a start time of the time lapse is associated with receiving the first eligible SIMs poll request;

determining, based at least in part on the time lapse, to update the first list of eligible SIMs.

6. A method comprising:

receiving firmware data to enable one or more device features;

at a first time, transmitting, to a network server associated with a service provider, first eligible devices poll request;

receiving, from the network server, a first list of eligible devices;

receiving, from a user device via a firmware over-the-air (FOTA) agent, a firmware update request, the firmware update request including a device identifier and a subscriber identity module (SIM) identifier;
determining the SIM identifier is not included in the first list of eligible devices, the SIM identifier being associated by the service provider with a first SIM profile;
at a second time that is later than the first time, transmitting, to the network server associated with the service provider, a second eligible devices poll request;
receiving, from the network server, a second list of eligible devices;
determining the SIM identifier is included in the second list of eligible devices, wherein the SIM identifier is associated by the service provider with a second SIM profile, reflecting a SIM profile update; and
transmitting, to the user device, the firmware data.

7. The method of claim 6, wherein:
the first eligible devices poll request and the second eligible devices poll request each includes query data; and
the query data includes one or more of a device type, a device feature identifier, or a timestamp.

8. The method of claim 6, wherein the first eligible devices poll request and the second eligible devices poll request each includes required SIM data, the required SIM data including one or more of a Subscription Concealed Identifier (SUCI), a Subscription Permanent Identifier (SUPI), or an authentication key.

9. The method of claim 6, wherein the device identifier includes one or more of a device model, a device type, or a device name, and wherein the SIM identifier includes an International Mobile Subscriber Identity (IMSI).

10. The method of claim 6, wherein the user device is a 5G Standalone (SA) capable device and the one or more device features includes at least one 5G SA capability.

11. The method of claim 6, further comprising:
determining, based at least in part on a predetermined polling cycle, to update the first list of eligible devices; and
in response to determining to update the first list of eligible devices,
transmitting, to the network server, the second eligible devices poll request; and
receiving, from the network server, the second list of eligible devices.

12. The method of claim 6, further comprising:
receiving, from a second user device via a second FOTA agent, a second firmware update request;
determining that a second SIM identifier associated with the second user device is not included in the second list of eligible devices;
transmitting, to the network server, a device eligibility check including the second SIM identifier;
receiving, from the network server, a device eligibility status indicating that the second SIM identifier is eligible for the firmware data; and
transmitting, to the second user device and based at least in part on the device eligibility status, the firmware data.

13. The method of claim 6, further comprising:
receiving, from the user device, a SIM profile check, the SIM profile check triggered by the FOTA agent in response to detecting a new SIM card on the user device;
determining that a second SIM identifier associated with the new SIM card is not included in the second list of eligible devices;
transmitting, to the network server, a device eligibility check, the device eligibility check including the second SIM identifier;
receiving, from the network server, a device eligibility status indicating that the second SIM identifier is not eligible for the firmware data; and
transmitting, to the user device and based at least in part on the device eligibility status, a firmware incompatibility notification including a user prompt to update SIM profile with a service provider.

14. A system comprising:
one or more processors;
a memory; and
one or more components stored in the memory and executable by the one or more processors to perform operations comprising:
receiving a firmware update to update one or more device features;
receiving, from a user equipment (UE), a firmware update request including subscriber identity module (SIM) data and firmware version;
at a first time, transmitting, to a network server associated with a service provider and based at least in part on the firmware version, a first eligible device check including the SIM data;
receiving, from the network server and based at least in part on the SIM data, a denial for the first eligible device check, the SIM data being associated by the service provider with a first SIM profile;
transmitting to the UE a firmware incompatibility notification;
at a second time that is later than the first time, transmitting, to the network server, a second eligible device check including the SIM data;
receiving, from the network server and based at least in part on the SIM data, a confirmation for the second eligible device check, the SIM data being associated by the service provider with a second SIM profile, reflecting a SIM profile update; and
transmitting, to the UE, the firmware update.

15. The system of claim 14, wherein the first eligible device check and the second eligible device check are transmitted via an application programming interface (API) on the network server.

16. The system of claim 14, wherein the UE is associated with a 5G Standalone (SA) subscription for the service provider and the one or more device features includes at least one 5G SA capability.

17. The system of claim 14, wherein:
the SIM data includes a device identifier and a SIM identifier;
the device identifier includes one or more of a device model, a device type, or a device name; and
the SIM identifier includes an International Mobile Subscriber Identity (IMSI).

18. The system of claim 14, wherein the SIM data include one or more of a Subscription Concealed Identifier (SUCI), a Subscription Permanent Identifier (SUPI), or an authentication key.

19. The system of claim 14, wherein the operations further comprise:
transmitting, to the network server, an eligible devices poll request; and
receiving, from the network server, a list of eligible devices.

20. The system of claim 19, the operations further comprising:
- receiving, from a second UE, a second firmware update request;
- determining a second SIM identifier associated with the second UE is not included in the list of eligible devices;
- transmitting, to the network server, a third eligible device check including second SIM data;
- receiving, from the network server, a SIM eligibility status indicating that the second SIM identifier is not eligible for the firmware update; and
- transmitting, to the second UE and based at least in part on the SIM eligibility status, a notification to update SIM profile.

\* \* \* \* \*